Dec. 30, 1924.

W. D. VAUGHAN

BOLT

Filed Jan. 28, 1924

1,521,489

Walter D. Vaughan, INVENTOR.

BY Geo. P. Kimmel, ATTORNEY.

Patented Dec. 30, 1924.

1,521,489

UNITED STATES PATENT OFFICE.

WALTER D. VAUGHAN, OF RUTLAND, VERMONT.

BOLT.

Application filed January 28, 1924. Serial No. 689,891.

*To all whom it may concern:*

Be it known that I, WALTER D. VAUGHAN, a citizen of the United States, residing at Rutland, in the county of Rutland and State of Vermont, have invented certain new and useful Improvements in Bolts, of which the following is a specification.

This invention relates to bolts and has for its primary object the provision in a manner hereinafter set forth, of a bolt having a head adapted to be removed from the shank of the bolt and provided with means whereby, when the bolt is in position, the head will be tightly and immovably held on the shank.

It is well known that in certain structures particularly automobiles, railroad cars and locomotives, there are places about the frame where other parts of the machine are so closely located thereto that bolts cannot be put through the frame from the inside but must be put through from the outside bringing the nut on the inside in a position very difficult to reach with a wrench. In applicant's structure of bolt this trouble is eliminated, for in using his bolt the head is removed from the end of the shank, and that end to which the head is attached is inserted through the bolt hole whereupon the head is applied to the other end after it has passed through the hole and the nut is applied to the threaded end which is left extending outwardly from the outside of the material through which the bolt has been passed, thus placing the nut in an open position and easily accessible for the application of a wrench or tightening means.

The final object of this invention is the provision in a manner as hereinafter set forth, of a bolt having a removable head, which bolt structure is simple in construction, strong, durable and inexpensive to manufacture.

The invention will be best understood from a consideration of the following detailed description taken in connection with the accompanying drawings forming part of this specification, with the understanding that the invention is not confined to any strict conformity with the showing of the drawings, but may be changed and modified so long as such changes and modifications mark no material departure from the salient features of the invention as expressed in the appended claims.

In the drawings:—

Figure 1:
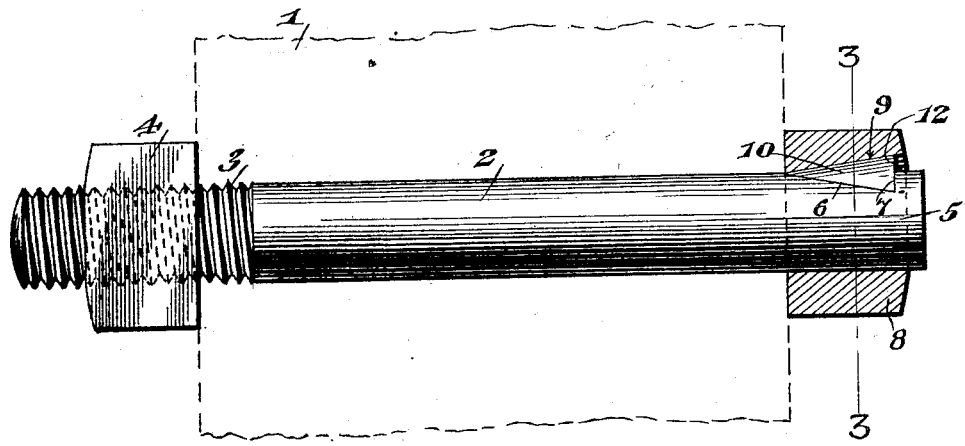
Figure 1 is a side elevation of the device embodying this invention, shown as applied, with a part thereof broken away.
Figure 2:
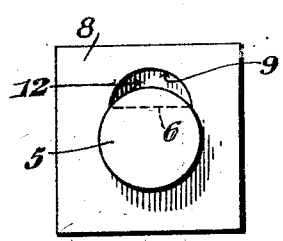
Figure 2 is an end elevation of the bolt shank and the removable head.
Figure 3:
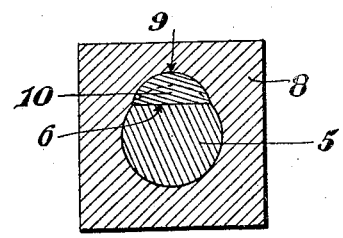
Figure 3 is a sectional view taken upon the line 3—3 of Figure 1.
Figure 4:
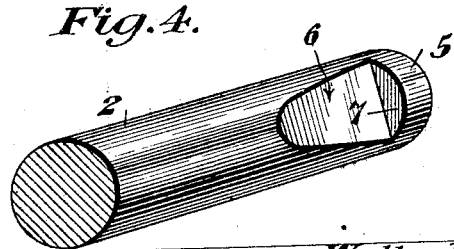
Figure 4 is a detail perspective view of one end of the bolt shank with the head removed and showing the recess adapted to receive the key by which the head is secured to the shank and, Figure 5 is a detail perspective view of the key by which the head is secured to the shank of the bolt.
Figure 5:
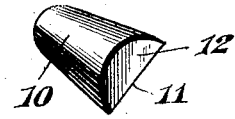

Referring now to the drawings in detail, wherein like numerals of reference indicate corresponding parts throughout the several views, numeral 1 indicates a body of material through which there is extended the shank of a bolt 2 having the usual screw threads 3 upon one end thereof and the nut 4 threaded thereon and by which the work is secured between the head and the nut of the bolt. The other end of this shank 2 instead of having the usual head formed integral therewith as is the case in the bolts at present in use, has the head end 5 finished off with the diameter equal to the diameter of the body of the bolt shank. In the side of this head end 5 of the shank there is formed a notch 6 which is formed by cutting into the body of the shank at an angle with respect to the longitudinal axis of the bolt, the cutting deepening as it progresses toward the outer or head end 5 of the bolt and terminates inwardly of the end whereat a transverse cut is made removing a portion of the body of the shank and forming the vertical or transverse wall 7.

The head 8 of this bolt is formed separately from the shank as is clearly shown, and has a central bore therethrough of a diameter equal to the diameter of the bolt, but the continuity of the wall of this bore is broken by the formation of a recess 9 therein which recess tapers and deepens from the inner end of the bore of the bolt toward the outer end and at its outer end is substantially semi-circular in contour.

When the head 8 is slipped over the end 5 of the shank 2, the recess 9 is adapted to coincide with the notch 6 formed in the body of the bolt shank and there is provided a key 10 of tapering substantially semi-circular design, the flat face 11 of which is adapted to seat against the face of the notch 6, and the end 12 adapted to abut the wall 7 formed in the end 5 of the shank, with the semi-circular portion fitting into the recess 9 of the bolt head, which assembly is clearly shown in Figure 1 of the drawings.

In applying this bolt to a piece of work, when there is another piece of work so close that the bolt cannot be extended through the one piece from the side adjacent to the other piece, the head 8 is removed from the shank and the shank is passed through the work from the outside and extended therethrough until the head end 5 projects beyond the inner side of the piece of work. The head 8 is then inserted over the end of the shank and slips back until the outer side is close to the inner or shallow end of the notch 6 whereupon the key 10 is placed in the notch 6 and the head slips forward again until the recess 9 covers the key whereupon the end 12 of the key will be forced against the wall 7 of the shank and the three elements securely wedged together. The shank can then be drawn outward again until the head contacts with the inner side of the work whereupon the nut 4 can be applied to the threaded end of the shank to tighten the bolt in position.

From the foregoing description it may be seen that a bolt is provided having many advantages over the bolts at present in use for with a bolt of this type the nuts can always be so positioned that they will not be placed in a position difficult to be reached by a wrench.

What I claim is:—

1. A bolt of the character set forth comprising, a shank having one end peripherally threaded to receive thereon a nut, a head freely slidable upon said shank, and a key adapted to engage in said shank and upstanding therefrom and adapted to have said head slid thereover to set up a wedge lock between the head and the shank.

2. A bolt of the character set forth comprising, a shank having one end peripherally threaded to receive thereon a nut, a key wedge having one side set into said shank and the other side forming a gradual upward incline from the body of the shank towards the outer end thereof, and a head having a smooth bore therethrough for free movement upon the shank and having tapering means formed in the wall of the bore to allow it to be slid over said wedge for setting up a locking engagement with the shank.

3. A bolt of the character described comprising, a shank peripherally threaded at one end to receive thereon a nut, and having formed in its side at the other end thereof a tapering notch terminating near the outer end in a transversely extending wall, a head having a bore therethrough to receive said notched end and further having a tapering recess in the wall of said bore increasing in depth from the inner to the outer end thereof, and means common to said notch and recess for preventing the removal of said head from said shank.

In testimony whereof, I affix my signature hereto.

WALTER D. VAUGHAN.